US006033565A

United States Patent [19]

Van Heesch et al.

[11] Patent Number: 6,033,565

[45] Date of Patent: Mar. 7, 2000

[54] SYSTEM FOR TREATING GASES OR FLUIDS WITH PULSED CORONA DISCHARGES

[75] Inventors: Egbertus Johannes Maria Van Heesch, Eindhoven; Hendriekus Wilhelmus Maria Smulders, 's-Hertogenbosch; Robertus Hendricus Petrus Lemmens, Veldhoven; Pieter Cornelis Tobias Van Der Laan, Aalst-Waalre, all of Netherlands

[73] Assignee: Stichting voor de Technische Weteschappen, Utrecht, Netherlands

[21] Appl. No.: 09/077,212

[22] PCT Filed: Nov. 22, 1996

[86] PCT No.: PCT/NL96/00463

§ 371 Date: Jul. 17, 1998

§ 102(e) Date: Jul. 17, 1998

[87] PCT Pub. No.: WO97/18899

PCT Pub. Date: May 29, 1997

[30] Foreign Application Priority Data

Nov. 23, 1995 [NL] Netherlands ........................... 1001732

[51] Int. Cl.[7] ................................ B03C 3/68; B60H 3/06

[52] U.S. Cl. .................... 210/243; 422/186; 422/186.04; 96/24; 96/82; 361/225

[58] Field of Search .................................... 210/243, 748, 210/205; 96/24, 80, 82, 96; 95/81; 422/186, 184.04, 907; 361/225, 226, 235; 204/164; 323/903

[56] References Cited

U.S. PATENT DOCUMENTS

| | | | |
|---|---|---|---|
| 4,592,763 | 6/1986 | Dietz et al. . | |
| 4,695,358 | 9/1987 | Mizuno et al. | 204/174 |
| 4,779,182 | 10/1988 | Mickal et al. | 363/37 |
| 4,909,812 | 3/1990 | Shapenko et al. | 55/139 |
| 4,919,690 | 4/1990 | Lovelock . | |
| 5,053,914 | 10/1991 | Wessel et al. | 361/235 |
| 5,644,079 | 7/1997 | Rilling et al. | 73/204.22 |

FOREIGN PATENT DOCUMENTS 2 265 557 10/1993 United Kingdom .

*Primary Examiner*—David A. Simmons
*Assistant Examiner*—Frank M. Lawrence
*Attorney, Agent, or Firm*—Young & Thompson

[57] ABSTRACT

System for treating gases or liquids by corona discharge, comprising: a) a corona discharge space through which the gases or fluids to be treated are guided; b) a corona wire inside the corona discharge space; c) a source for supplying high voltage pulses, whereby the output of the source is connected to the corona wire; d) sensors for measuring the power dissipated in the corona discharge space; e) an electromagnetically compatible case.

27 Claims, 5 Drawing Sheets

SYSTEM FOR TREATING GASES OR FLUIDS WITH PULSED CORONA DISCHARGES

FIELD OF THE INVENTION

The invention relates to a system for treating gases or liquids by means of corona discharge, comprising:

a) a corona discharge space through which the gases or fluids to be treated are guided, b) a corona wire inside the corona discharge space, c) a source for generating a high voltage, the output of said source being connected to the corona wire, d) control electronics for controlling the operation of the high voltage generating source based on at least one parameter related to the corona discharge space.

BACKGROUND OF THE INVENTION

A system of this type is known from U.S. Pat. No. 4,779,182. In this prior art system the corona discharge space is used to scrub a waste gas of foreign matter. The high voltage generating source supplies a high DC voltage to the corona wire inside the corona discharge space. The control electronics for controlling the operation of the high voltage generating source receives a signal from a measuring circuit measuring the high voltage supplied to the corona wire and receives furthermore signals indicating the amount of foreign matter in the gas to be treated at the input of the corona discharge space and at the output of the corona discharge space.

If this type of system has to be used on an industrial scale in general a high processing capacity is desirable. To obtain a high processing capacity in general a large electrical power has to be dissipated inside the corona discharge space. To restrict the current supplied to the corona wire the only way to increase the dissipated power is to increase the voltage level of the high voltage generating source. Very high voltages and still restricted power levels can only be obtained if, instead of a DC voltage, voltage pulses are supplied. The use of voltage pulses for powering a corona discharge space is known as such, see for instance U.S. Pat. No. 4,919,690 and U.S. Pat. No. 4,695,358.

A significant disadvantage of the use of high voltage pulses is the disturbing effect thereof.

SUMMARY OF THE INVENTION

A first object of the invention is now to provide proper shielding measures which will allow the use of high voltage pulses instead of DC because they effectively inhibit the transmission of very broad spectra of disturbing energy.

In agreement with said object the system as defined in the first paragraph is characterized in that the high voltage generating source generates high voltage pulses, and that the system comprises furthermore e) an electromagnetically compatible case formed by one or more housings of electrically good conducting material, each completely closed or closed to a large extent, whereby

- the corona discharge space is surrounded by one of these enclosures,
- the high voltage generating source is surrounded by another of these enclosures,
- the control electronics are installed inside at least one or more further enclosures, whereby the enclosures are mutually connected in a well conducting manner and whereby signal conduits, high voltage conduits and supply conduits extending between the mutual enclosure as well as between said enclosures and the outside world comprise at least two parallel conductors, of which at least one conductor at the in/output in/out an enclosure is connected electrically conducting to the wall of said enclosure and surrounds thereby the other conductor completely.

It is remarked that electromagnetic shielding is of course known as such. An example thereof in combination with a high voltage source for supplying a high DC voltage to a corona discharge space is described in GB-2265557. However, the shielding in this prior art system does not fulfil the requirements as indicated above by the invention, and is certainly unsuited if a pulsating voltage would be fed to the corona discharge space.

Although as such sensors for measuring a parameter related to the corona discharge space are known from for instance U.S. Pat. No. 4,779,182 in the form of gas contents measurement probes, in many industrial applications it is preferred not to control the high voltage generating source on the basis of the parameters of the gases or liquids to be treated, but to control the high voltage generating source on the basis of the electrical parameters of the discharge phenomena inside the corona discharge space. Up to now such control systems in combination with a source supplying high voltage pulses were hardly conceivable because of the disturbing influence of the high voltage pulses on the control electronics.

The electromagnetically compatible case proposed by the invention now offers the possibility to create a properly functioning feedback circuit, controlling the high voltage source on the basis of signals from sensors in the corona discharge space. In agreement therewith the system according to the application is preferably characterized in that the system comprises sensors for measuring the dissipated power inside the corona discharge space. More preferable, the sensors for measuring the power dissipated inside the corona discharge space comprise a voltage sensor formed by a ring or a section of a ring around or at least partly around the conductor which forms the connection between the corona wire and the high voltage generating source. The sensors for measuring the power dissipated inside the corona discharge space comprise a current sensor formed by a measuring winding or measuring loop installed at a distance around the conductor which forms the connection between the corona wire and the source for supplying the high voltage pulses.

From the prior art various different embodiments of high voltage generating sources, either for DC voltages or for pulsating voltages, are known. Embodiments of high voltage generating sources comprising a spark gap were not preferred because unavoidably the use of a spark gap would result into high disturbance level for electronic circuits in a wide area around the spark gap (including the control circuits of the high voltage source itself). High voltage sources including a spark gap are, however, very reliable and efficient.

Thanks to the electromagnetically compatible case provided by the invention it is now possible to embody a preferred system according to the invention such that the source for supplying high voltage pulses comprises:

- a resonant charging circuit for charging each time a capacitor,
- a spark gap through which the capacitor can discharge as soon as the voltage across the capacitor is high enough,
- a voltage multiplier by means of which the pulse shaped spark gap voltage is increased.

It is especially preferred that the resonant charging circuit comprises two stages:

a first stage in which starting from the rectified mains voltage through a triggered thyristor and through a coil a first capacitor is charged, and a second stage in which the first capacitor through a triggered thyristor is discharged across the primary winding of a high voltage transformer of which the secondary winding is connected to said spark gap capacitor.

To reduce the disturbing influences on the environment which may be caused especially by the high voltage pulses, it is preferred that the electromagnetically compatible case is formed by one or more housings of electrically good conducting material and closed to a large extent, whereby the corona discharge space is surrounded by one of these enclosures, just as the source for supplying the high voltage pulses, and whereby the control electronics are installed inside at least one or more further enclosures, whereby the enclosures are mutually connected in a well conducting manner and whereby signal conduits, high voltage conduits and supply conduits running between the mutual enclosures as well as between said enclosures and the outside world comprise at least two parallel conductors, of which at least one conductor at the in/output in/out an enclosure is electrically conducting connected to the wall of said enclosure and surrounds thereby the other conductor completely.

BRIEF DESCRIPTION OF THE DRAWINGS

The invention will now be described in more detail with reference to the attached drawings.

DETAILED DESCRIPTION OF THE INVENTION

Figure 1:
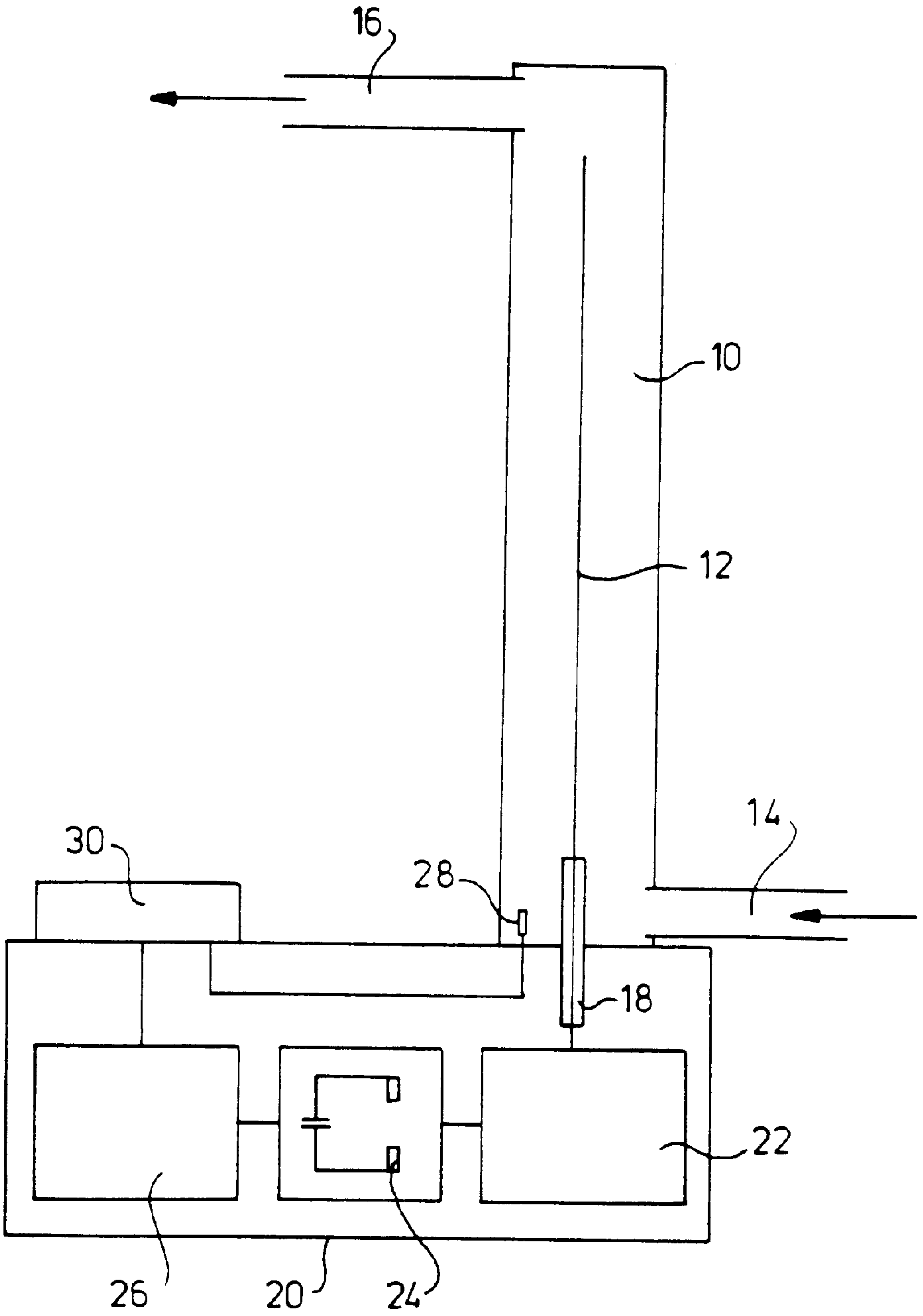
FIG. 1 illustrates schematically an embodiment of a system according to the invention.

FIG. 1 illustrates schematically the corona discharge space 10 with centrally therein the corona wire 12. The fluidum (gas or fluid) to be cleaned is input in the discharge space at the lower side thereof through the tube 14 and the cleaned fluid is output at the upper side through the pipe 16. It is remarked that it is also possible to let the fluid to be cleaned flow from top to bottom (from 16 to 14) through the space 10.

FIG. 1 illustrates furthermore very schematically the high voltage pulse source 20 of which the housing is in an electrically conducting manner connected to the corona discharge space 10 and is electro-magnetically screened by means of eddy currents. The corona wire 12 in the discharge space 10 is through a high voltage feedthrough 18 connected to the pulse voltage multiplier 22. Said multiplier is energized by the combination of a spark gap and a capacitor, as combination indicated by 24. A charging circuit 26 takes care of charging the capacitor within the combination 24. In the discharge space 10 one or more sensors 28 are installed which provide a signal, which is dependent on the power dissipated in the space 10, to a measuring circuit 30. This measuring circuit 30 generates a control signal for controlling the charging circuit 26 such that the power, ultimately dissipated in the space 10, is maintained at a desired level.

In a characteristic embodiment the high voltage pulse 20 generates repeating pulses up to 10 kw average output power, up to 1000 Hz pulse repetition frequency and up to 180 kv peak voltage. The pulses have a rise time of approximately 10 ns and a width of approximately 100 ns, the polarity is positive or negative at choice.

By applying a specific EMC-concept, details of which will be provided in the following, the system does not produce any disturbing electrical or electromagnetical coupling to the environment. This concept will also be applied to avoid disturbance and undesired mutual interaction between subsystems of the system itself.

It is included in the EMC-concept that the discharge space, to which the pulses are supplied, is an integral part of the housing of the system. Inside the discharge space the pulses are dissipated by means of very intense pulsed corona discharges, whereby in a characteristic embodiment of the system the total electrical efficiency, i.e. the dissipation in the discharge space 10 divided by the total power, taken up from the mains, is better than 65%.

To realize a very intense pulsed corona it is preferred that the inside of the corona space comprises a closed bed of needles which extends from the inner wall in the direction of the corona wire. (As such the use of needles of this type is known for instance from De-4209196). A flow of gas to be treated passes the discharge space. Through modifications the system can be applied for treating a flow of liquid instead of a flow of gas.

The pulse source is built around a spark gap 24 and a pulse voltage multiplier 22, especially a so-called transmission line transformer (TLT).

Approximately 80 microseconds wide pulses of approximately 30 kv, supplied by a resonant charging circuit, are through the spontaneously switching or automatically triggered spark gap converted into very rapidly rising pulses and supplied to the TLT. The TLT provides in the preferred embodiment a voltage multiplication of approximately four times. In relation to a long life the spark gap has very robust electrodes, the preferred embodiment comprises an automatically functioning trigger provision and a well blown discharge space; the switching is performed by means of spontaneous or automatically triggered breakdown between the electrodes of the spark gap. In the preferred embodiment there is a needle made of metal or tungsten, incorporated in one of the electrodes, which takes care that the breakdown process is reliable and is performed on time. Compact, induction-free connections between the high voltage sections guarantee a short pulse rise time. The output of the TLT is connected to the discharge space.

The electrical energy flowing into the discharge space is continuously measured by means of a power meter 30 having a large band width. A differentiating/integrating D/I measuring system for voltage and one for current generate the input signals. The respective sensors 28 are forming an integral part of the system. The repetition frequency of the high voltage pulses can be controlled automatically to maintain the set output power.

The amount of energy dissipated in the controlled discharges determines the processing capacity for the flow of gas or fluid. The discharge space can be considered as a transmission line with losses. The dissipation is in that case determined by the adaption between the TLT and said transmission line, and by the discharge activity. The discharge activity is highly intensivated by the presence of a bed of needles in the discharge space. The length of the transmission line can be optimized.

Thanks to the use of pulses there is a broad area in which the discharges are active and are controllable without the occurrence of a complete breakdown and without temperature, pressure, gas composition, and contamination being a restriction: temperature 0° C.–850° C., pressure 20 kPa up to 200 kPa, peak voltage 40 kV up to 200 kv.

Figure 2:
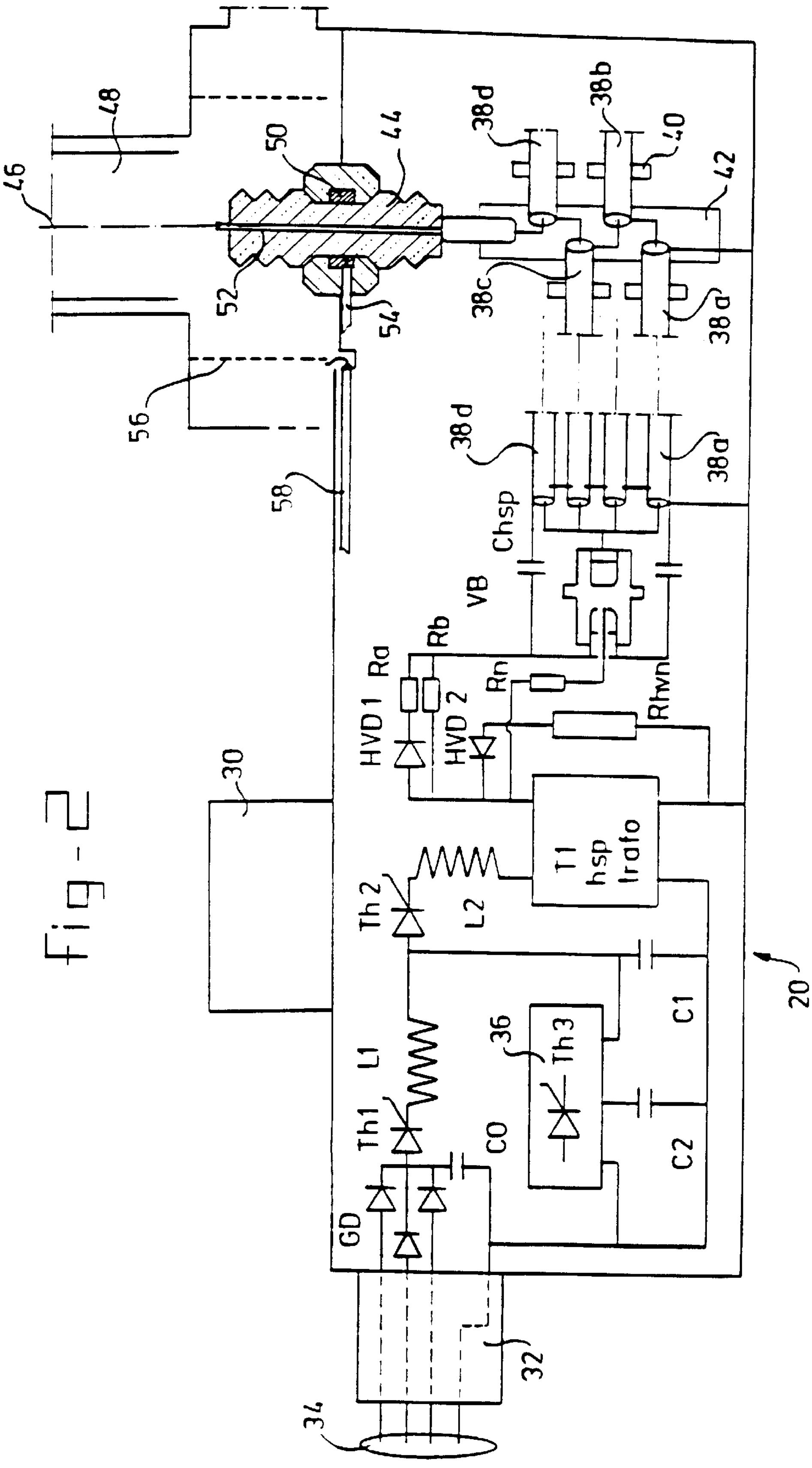
FIG. 2 illustrates in more detail the circuit of a high voltage pulse source.

FIG. 2 illustrates schematically a part of the corona discharge space through which the gases or fluids to be treated are guided and illustrates furthermore in detail the high voltage pulse source 20 for powering the corona wire 12 in the corona discharge space 10, the sensors for measuring the power dissipated inside the corona discharge space 10 and the electromagnetically compatible housing.

The mains voltage on the wires 34 is supplied into the unit 20 through a suitable single or double LC-mains filter 32, which is known as such, to become rectified. For that purpose a diode GD is present in each phase and all these diodes are connected to a smoothing capacitor C0. The voltage VC0 on each C0 is nearly constant. Various safety precautions and means for switching on/off could be added which, however, within the scope of the invention, are of no importance. Instead of three phases, such as in the figure is assumed as example, also a supply configuration through one single phase is conceivable.

A triggered thyristor Th1 charges the capacitor C1 from C0 through coil L1 up to a top value of VC1top which in the embodiment is between 600–1000 V. The time length of this charging process is between approximately 10 microseconds and 1000 microseconds dependent on the values of C0, L1 and C1. The thyristor Th1 extinguishes when obtaining the top value VC1top on C1. The obtained top value is also dependent on the initial value VC1ini of the voltage on C1 at the beginning of the charging process.

The triggered thyristor Th2 takes care of discharging of C1 through the coil L2 and the primary winding of the high voltage pulse transformer T1. The primary pulse, generated thereby, is transformed up by T1 to the level of 20–40 kv necessary at the secundary side. This secundary pulse is used to charge the spark gap capacitor Chsp through the diode HVD1. The time length of this charging process has a value between approximately 10 microseconds and 1000 microseconds dependent amongst others on the value of C1, L2, and Chsp. The diode HVD2 enables the attenuation of the magnetizing current of T1 in the ohmic load Rhvn after the charging cycle.

Preferably a snubber circuit, comprising the impedances Ra and Rb is added to the diode HVD1 to restrict the peak current through said diode HVD1.

Preferably the transformer comprises a screen to avoid oscillations between induction and parasitic capacitance of the windings which screen is earthed through a resistor onto the housing of the system.

Figure 3:
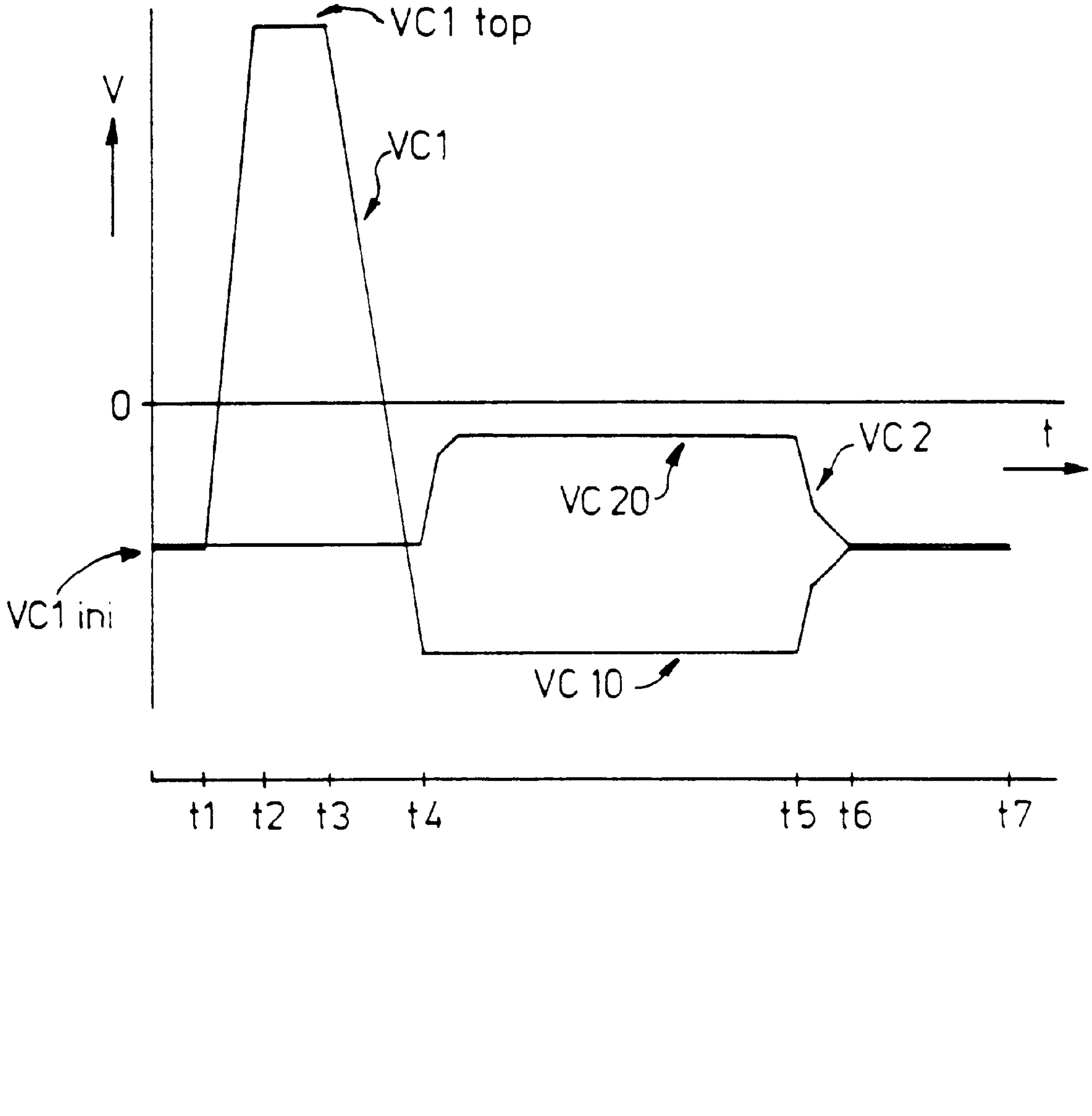
FIG. 3 illustrates a signal curve used for clarifying the functioning of the high voltage pulse source.

After transferring the energy from C1 through Th2 at the abovedescribed manner a residual voltage is left on C1. FIG. 3 provides more details thereof. In this figure the voltage across the capacitor C1 is illustrated as function of time. At the time moment t1 the thyristor Th1 is triggered and starts charging the capacitor C1. At the time moment t2 the maximum voltage VC1top is reached and the thyristor Th1 extinguishes. At the time moment t3 the thyristor Th2 is triggered and a charge is withdrawn from C1 and used to charge the spark gap capacitor Chsp. The voltage across C1 decreases therefore until, caused by a zero crossing, the thyristor Th2 extinguishes at the time moment t4.

If in the period between t3 and t4 the voltage across the spark gap capacitor Chsp is high enough to obtain the ignition voltage of the gap, then the gap will ignite. If not, then the capacitor Chsp will be charged further in the succeeding cycle until the ignition voltage is reached. As a result thereof the voltage VC10 across C1 at the time moment t4 may fluctuate. To take care that charging of C1 always starts at a controlled initial voltage VC1ini across S1 the controller 36 is used. This controller cooperates with an auxiliary capacitor C2. The auxiliary capacitor is discharged from time moment t4 to a level VC20. This level is reached as a weighted average (GG1.2) of the continuously measured voltages VC10 and VC2 not exceeds anymore a selectable fixed threshold V0. Averaging and measuring is done by an ohmic network with three resistors. The threshold voltage is a Zener voltage.

In this manner C2 reaches the voltage VC20. Thereafter, at time moment t5, C1 is dumped through the thyristor Th3, forming part of the controller 36, onto C2. Both VC1 and VC2 obtain a value VC1ini. The final value of VC1ini is therewith also dependent on the selected Zener voltage and the adjustment of the ohmic network.

The controller 36 has a stabilizing influence: if VC10 becomes more negative then VC1ini becomes more negative. That will cause VC10 to become less negative in the next cycle. Also a positive movement will be attenuated by the controller 36.

The controller 36 provides therewith an optimum adjustment of VC1ini. The choice of VC1ini in turn has its influence on the electrical efficiency and stability of the resonant charging process.

The spark gap VB is preferably coaxially embodied and the capacitor Chsp is preferably realized in a divided manner in the outer conductor of this structure. The central conductor comprises two heavily built electrodes. The spark gap is flashed with air. The self-induction is approximately 40 nH, but preferably in any case lower than 100 nH. The spark gap is only schematically indicated in FIG. 2. More details will be provided hereafter with reference to FIG. 4. The spark gap does not have to comprise a separate trigger generator because she will switch spontaneously or will be triggered automatically each time when during the resonant charging of Chsp the set ignition voltage is reached. The spark gap is therefore running automatically which makes a separate trigger generator superfluous and results into a robust apparatus needing less maintenance.

In a preferred embodiment the spark gap comprises a metal or tungsten needle, installed in the high voltage electrode. Through a resistor or impedance Rn this needle is connected to the high voltage terminal of the high voltage transformer T1. After the charging, as soon as the transformer voltage is heading for a negative value, a very high electrical field is created near the point of the needle in which field local discharging processes will take place. That is exactly the purpose of the needle, i.e. to function as supplier of initial electrons which are necessary to obtain ignition, i.e. the main ignition of the spark gap, in case a spontaneous breakdown is not succeeded.

To obtain a long lifetime of the spark gap it is preferred that part of the electrodes in the spark gap is made of a metal being an alloy in which tungsten is a component. By application of tungsten the wear to the spark gap is relatively small so that the operating conditions do not change or only change in an negligible manner and therefore the whole circuit of the high voltage source keeps functioning correctly.

The diode HVD1 maintains energy in Chsp in case of an eventual refusal of the spark gap. Because of this extra energy an ignition after the next charging cycle is almost sure.

By means of a multiplier the pulse, generated by the spark gap, is brought to such a high voltage level that supplying this level to the corona wire will lead to a very intense corona discharge in the space 10. In the illustrated embodiment the multiplier consists of a parallelserial switched cable pulser. Such a structure is in the literature indicated by the term transmission line transformer, abbreviated as TLT.

In the underlying case the transmission line transformer comprises a number of coaxial cable sections 38*a* . . . 38*d* of equal length. In a preferred embodiment four sections are applied, however, this number may be smaller or larger. The cable sections are connected in parallel to the switched side of the spark gap. In other words, the inner conductors of the cables are in common connected to the respective spark gap electrode and the outer connectors are in common connected to the respective side of the spark gap capacitor Chsp. At the other side the cable sections are connected in series to the high voltage feedthrough to the discharge space. In other words, at the output side the inner conductor of the first cable section 38*a* is connected to the outer conductor of the second cable section 38*b*, the inner conductor of the second cable section 3B*b* is connected to the outer conductor of the third cable section 38*c*, etc. The outer conductor of the first cable section 38*a* is earthed and the high voltage is taken off from the inner conductor of the last section 38*d*. This part of the transmission line transformer will be illustrated in more detail in FIG. 6.

The length of each cable section is between 1 and 100 meters, in a representative embodiment the length was 20 meters per cable section. At the input side the parallel connection of the cable sections is made in the ground plate of the spark gap. The series connection of the cable sections at the output side is realized in a special cable block 42 (see also FIG. 6). To suppress fly back of the waves through external wave structures outside the cable block 42, ferrite 40 is attached around each of the cable sections. The cable block is only schematically indicated in FIG. 2. The cable pulser provides a voltage multiplication by a factor 3 to 5, especially 4.

Figure 4:
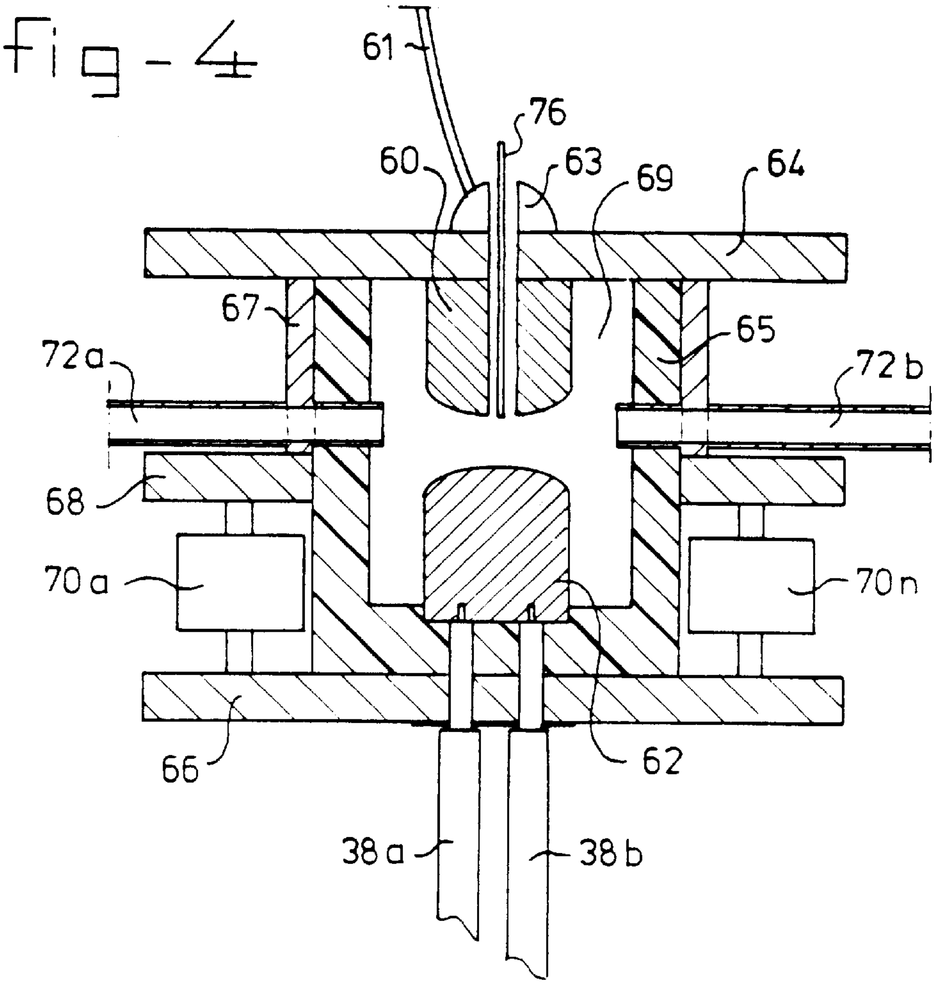
FIG. 4 illustrates a cross section through the spark gap construction.

FIG. 4 illustrates in more detail the spark gap VB. As already said, the spark is created between two aligned electrodes 60 and 62. To restrict wear as much as possible in a preferred embodiment the electrode 62 and eventually also electrode 60 are made of a tungsten containing alloy. The electrode 60 is fixed to the metal plate 64. The connecting cable 61 running to the diode HVD1 (see FIG. 2), is at 63 welded or soldered to the metal plate and extends eventually to inside the electrode 60. Both electrodes are positioned in the inner free space 69 of a cup-shaped cylindrical body 65 made of electrically insulating material. The other electrode 62 is attached to the bottom of the cupshaped insulating body 65. Around the upper side of the body 65 the cylindrical outer conductor 67 and the cylindrical connection ring 68 are positioned. The parts 64, 67, and 68 are mutually connected in an electrically conducting manner. A further plate 66 is attached to the underside of the cup-shaped insulating body, which further plate extends beyond the bottom of the cup-shaped body 65, and between the edge of the plate 66 and the connecting ring 68 the capacitors 70*a* . . . 70N . . . are installed, together forming the already mentioned and in FIG. 2 illustrated spark gap capacitor Chsp. Through plate 66 and through the bottom of the insulating body 65 passages are made through which extend the insulating inner conductors of the coaxial cable sections 38*a* . . . 38*d* forming part of the already mentioned transmission line transformer. As illustrated in FIG. 4 the inner conductors of each of the cable sections 38*a* . . . 38*d* are connected to the electrode 62 whereas the outer jackets of these cable sections are connected to the plate 66.

To be able to flash the spark space 69 properly both air channels 72*a* and 72*b* extend through the cylindrical outer conductor 67 and through the cup-shaped body 65 such that an airflow can be created through the central part of the spark gap between the electrodes 60 and 62.

The above already mentioned needle-shaped trigger electrode 76 is installed in a passage through the upper spark gap electrode 60. The point of this trigger electrode 76 is positioned near the space in which the main discharge has to take place. The other end of the trigger electrode 76 is connected through a resistor or impedance Rn to the high voltage terminal of the secondary winding of the high voltage transformer T1 as is illustrated in FIG. 2.

Figure 6:
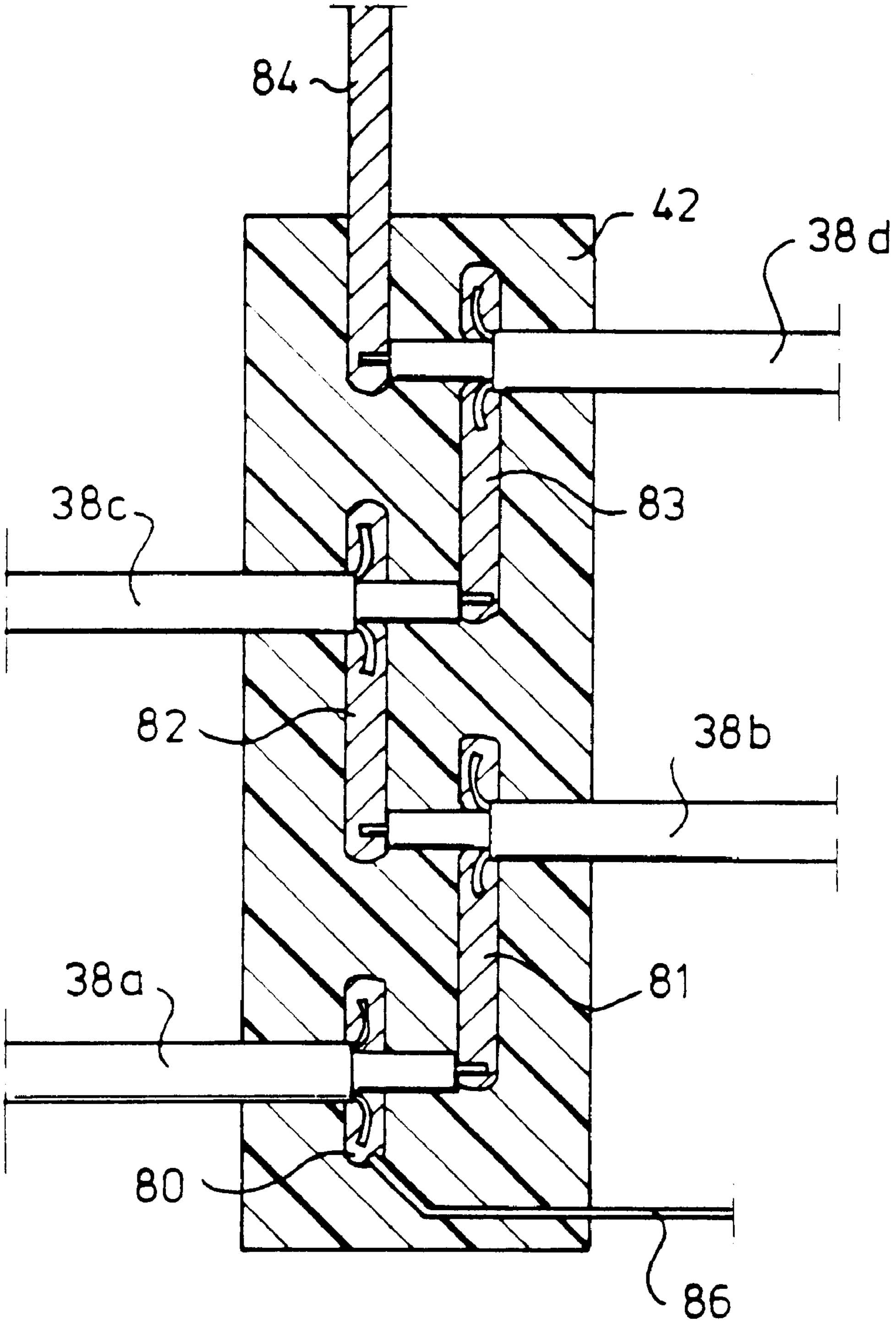
FIG. 6 illustrates schematically the construction of the cable block at the high voltage side of the transmission line transformer in the high voltage pulse source.

At the high voltage side the cable sections 38*a* . . . 38*d* of the high voltage transformer are connected inside a cable block 42 which is illustrated in more detail in FIG. 6. This cable block is made of electrically insulating material in which a number of metal elongated plates or rods 80, 81, 82, 83, and 84 are embedded. Through these plates the ends of the cable sections 38*a* . . . 38*d* are connected in series such that the voltage pulses appearing at the ends of these cable sections are summed. Especially the inner conductor of the first cable section 38*a* is through the plate 81 connected to the outer conductor of the second cable section 38*b*, the inner conductor of the second cable section 38*b* is through the plate 82 connected to the outer conductor of the third cable section 38*c*, and the inner conductor of the third cable section 38*c* is through the plate 83 connected to the outer conductor of the fourth cable section 38*d*. The outer conductor of the first cable section 38*a* is through plate 80 connected to an earth conductor 86 and through the outwards extending plate or rod 84 the high voltage is taken off from the inner conductor of the last cable section 38*d*.

As an example, the cable block can be manufactured by moulding whereby all plates 80 . . . 84 as well as the ends of the cable sections 38*a* . . . 38*d* during the moulding process are embedded. However, it is also possible to build the cable block from sections which together with the plates 80 . . . 84 and the cable sections are assembled and are attached or pressed to each other.

The high voltage pulse of the output of the TLT is transferred to the corona wire 46 through a high voltage feedthrough passage 44 extending through the wall between the discharge space 48 at the wall in which the pulse source is installed. The passage is substantially gas-tight and fluid-tight. The passage is furthermore designed for pulse operation up to 180 kV in a polluted environment and at a temperature up to 150° C.

In this embodiment a voltage sensor for sensing the voltage on the corona wire 46 is integrated in the passage 44. The sensor comprises a metal tube 50 embedded in the high voltage passage and positioned around the insulation of the high voltage conductor 52 through the passage 44. The sensor tube 50 is connected through a coaxial cable 54 to a power measuring circuit which will be discussed hereinafter.

In the lower part of the discharge space furthermore a current sensor is installed formed as a toroidal measuring winding 56 concentrically installed around the conductor 52 respectively around the lower part of the corona wire 46 and inductively coupled therewith. The terminals of the measuring coil 56 are through a coaxial cable 58 connected to the power measuring circuit which will be described hereinafter.

In the described embodiment the power measuring circuit is installed in a separate electrically conducting enclosure 30 of which the wall is conductingly connected to the wall of the pulse source 20. The current and voltage measurements are performed as D/I measuring systems. The sensors 50 and 56 (for voltage and current respectively) differentiate (D) the value to be measured. A coaxial cable (54 and 58 respectively) transports the signal to the power measuring circuit in the EMC-enclosure 30 in which the signal is integrated (I).

All measuring lines, control lines and power supply lines enter the enclosure 30 in such a manner that there is no interfering electrical or electromagnetical interaction between the apparatuses outside and inside the enclosure. The electronic circuits for controlling and safeguarding the pulse source are installed within the enclosure 30. Furthermore, the electronic circuits which, based on the measured V and I signals, supply signals which are related to the momentaneous and average power to the discharge space are installed herein. Especially these circuits supply a control signal for influencing the operation as such that in the discharge space a predetermined desired power is dissipated. Furthermore, these circuits control the operation of the thyristors Th1, Th2, and Th3.

Thanks to a special EMC-technique the apparatus as a whole does not have any disturbing influence on apparatuses in the neighbourhood. This EMC-technique is also used to obtain a proper internal functioning of the apparatus.

The EMC-technique is based on specific methods to eliminate disturbing influences by coupling of common mode (CM) currents. CM-currents are for instance introduced by power switching, by high voltage apparatus, or by electrical discharges. The driving force is an inductive or capacitive force or a direct galvanic coupling with sources.

The CM-current flows in closed circuits (CM-circuits). Measurement lines, power supply lines, enclosures, metal constructions, and also apparatuses may form part of these circuits. Starting point in the EMC-technique is the realisation of a very low transfer impedance between CM-currents and differential mode (DM) voltages in the apparatus. A DM-circuit is an intentionally installed two-way connection between two electrical apparatuses to exchange signals and power.

The building blocks of the EMC-technique are the EMC enclosure and the structures for DM-transport; both should have a low CM-to-DM transfer impedance; the DM-structures comprise at least two parallel conductors (such as for instance a coaxial cable of the types RG58, RG214, and RG223 or a copper tube having an inner signal conductor or a metal conduit having an inner signal conductor). The outer jacket or outer conductor of these structures is conductively connected to the wall of the EMC-enclosure at the transfer site to the EMC-enclosure. This conducting connection has to surround the inner conductor completely to avoid coupling phenomena at the transfer passage. Inside the EMC-enclosure are the apparatuses which are connected to the DM-circuits. The power supply lines are also considered as DM-circuits. A number of EMC-enclosures can be connected at various locations in a network of DMstructures.

In the described embodiment both the combined enclosures, i.e. the enclosure of the pulse source 20, the wall of the discharge space 48 and the enclosure 30 around the power measuring circuit, as well as the separate enclosures 20, 48, and 30 are considered as EMC-enclosure. Thanks to the above-described measures the transfer impedance between the source in the enclosure 20 and the world outside the enclosures 20, 48, and 30 remains very small. As a result the apparatus can be used in surroundings where highly sensitive electronics are present.

As far as possible differentiating DM sensors should be applied as sensors in combination with an integrator as passage to the EMC-enclosure.

Non-differentiated DM signals, which include power supply lines, should have a filter as passage to the EMC-enclosure; in that case the attenuation by this filter is outside the operating frequencies of the signal or power supply. Filters and integrators should provide proper attenuation at higher frequencies higher than a value between approximately 10 kHz and 10 MHz.

The above-mentioned integrators and filters have at least one passive component consisting of a resistor and/or a coil and a proper capacitor or feedthrough capacitor, both installed within a metal enclosure which is conductively connected, preferably all around, to the metal wall of the EMC-enclosure.

In case a complete surrounding of signal wires or power supply lines around the in/output of an enclosure or over the full length in case of a coaxial structure, is technically not possible, then a filter is installed at the in/output in each of the not correctly surrounded conductors. This filter comprises apart from coils and/or resistors and other components preferably one or more capacitive paths to the wall of the electromagnetically compatible enclosure located at the in/output.

In general the signal lines and power supply lines between electromagnetically compatible enclosures and between said enclosures and the outside world do comprise filters at the location of the in/output in/out the enclosure whereby the filter apart from coils and/or resistors and/or other components in the preferred embodiment do comprise one or more capacitive paths to the wall of the electromagnetically compatible enclosure at the location of the in/output. These filters are installed in each of the conductors of the circuit with the exception of the conductor functioning as surrounding component and being connected to the other enclosures.

It is not always possible to use enclosures without any hole at all. For instance, holes may be necessary in said enclosures for the supply of means and materials such as air, gases, air refreshment, air cooling, pressurized air, water supply, cooling water, fluids, oil, fuel supply, light, glass fibres, and optical signals, etc.

Holes in the electromagnetic compatible enclosures and in the enclosures of signal wires, power supply lines, and high voltage lines comprise according to a preferred embodiment one or more metal tubes, not forming part of the circuit of a signal wire, power supply line or high voltage line, which tubes have a length/diameter ratio which is larger than approximately 2, whereby the edge of the hole is connected electrically conducting all around to the wall of the tube.

Figure 5:
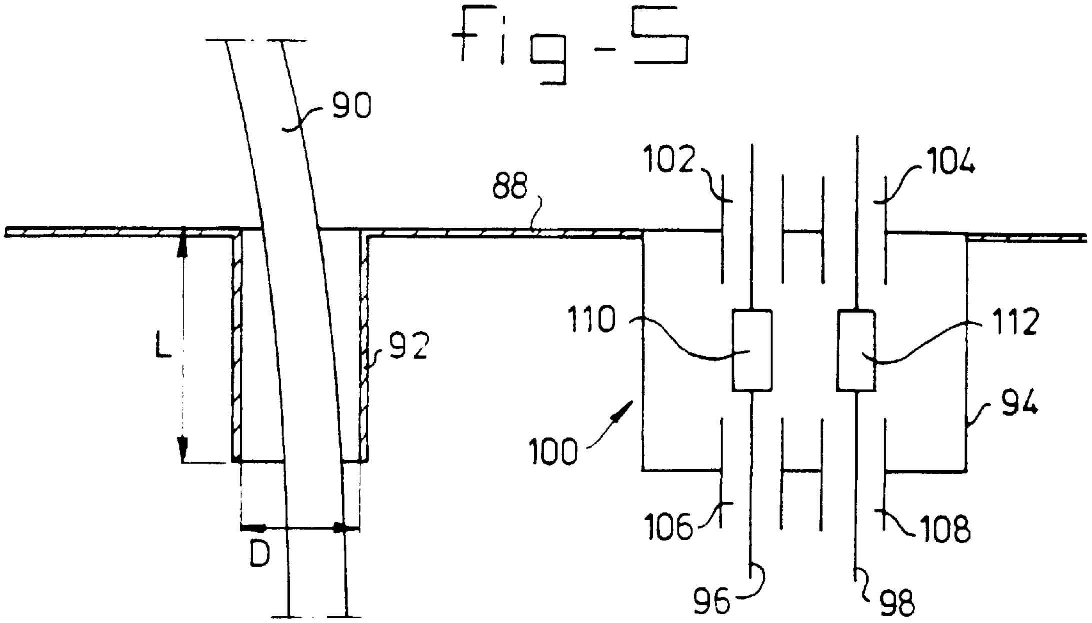
FIG. 5 illustrates part of an enclosure with throughput possibilities for a non-current conducting wire such as a fluidum conduit and for a non or only partly screened current conducting wire.

FIG. 5 illustrates schematically a wall section 88 of an enclosure. Left in the figure there is a hole through which for instance a cooling water tube 90 extends. Around said hole a tube section 92 made of electrically conducting material is installed and attached to the wall 88. To eliminate any disadvantageous influences of this hole according to the preferred embodiment the ratio between the length L and the diameter D should be L/D>2. This requirement also applies to the supply lines and drain lines 14 and 16 through which the gas to be cleaned is guided through the space 10.

On the right side of the figure two non-screened signal wires 96 and 98 extend through the wall 88. At the feedthrough location a filter unit 100 is installed comprising normal capacitors or feedthrough capacitors 102, 104, 106, and 108, the enclosure 94 and eventual further impedances 110 and 112.

As is indicated shortly above it is preferred that the wall of the corona discharge space comprises needles which are directed to the corona wire. The discharge space is a part of the large EMC-enclosure formed by the apparatus as a whole. Therefore, the discharge space fulfils the above-described principles. For covering the outer wall of the discharge space with metal needles preferably needles are applied which are each about 10 mm long and which cover the wall with a density of approximately 1000 to 10000 needles per $m^2$. Thanks to these needles the following advantages are obtained:

a. a decrease of the threshold voltage above which a very intense corona operating mode is created;

b. an independence of the polarity of the high voltage to the appearance of the very intense corona operating mode;

c. enlargement of the operating regime of said very intense corona operating mode.

The above-mentioned very intense corona operating mode is characterized by a pulsed corona current which is 20 to 1000 times larger than the capacitive current during the high voltage pulse.

Above the application of a corona wire 12 in the discharge space 10 is discussed. Practice has proven that best results are obtained with a relatively thin wire. If the applied wire is too thick, then no discharge is obtained. However, a very thin wire requires mounting elements to attach and maintain the wire inside the discharge space. It has appeared that instead of a wire, however, also a thicker rod can be used in case this rod has no smooth surface but comprises a number of outwards extending points, ribs, etc. Good results were obtained using a rod which is screw-threaded at its outer surface. Therewith a very robust construction can be realized which, in relation to the generation of a corona discharge inside the space 10 is as active as a thin corona wire.

We claim:

1. System for treating gases or liquids by means of corona discharge, comprising:

a) a corona discharge space through which the gases or fluids to be treated are guided, b) a corona wire inside the corona discharge space, c) a source for generating a high voltage, an output of said source being connected to the corona wire, d) control electronics for controlling the operation of the high voltage generating source based on at least one parameter related to the corona discharge space, characterized in that the high voltage generating source generates high voltage pulses, and that the system comprises furthermore e) an electromagnetically compatible case formed by housings of electrically good conducting material, each completely closed or closed to a large extent, whereby the corona discharge space is surrounded by one of these enclosures, the high voltage generating source is surrounded by another of these enclosures, the control electronics are installed inside at least one or more further enclosures, whereby the enclosures are mutually connected in a well conducting manner and whereby signal conduits, high voltage conduits and supply conduits extending between the mutual enclosures as well as between said enclosures and the outside world comprise at least two parallel conductors, of which at least one conductor at the in/output in/out an enclosure is connected electrically conducting to the wall of said enclosure and surrounds thereby the other conductor completely.

2. System according to claim 1, characterized in that the signal conductors and supply conductors extending between the enclosures are made of coaxial structures having an inner conductor surrounded by an outer conductor which is connected to the respective enclosures.

3. System according to claim 2, characterized in that in case the complete surrounding of the inner signal conductors or power conductors at the in/output of an enclosure all around or over the full length as in the case of a coaxial structure is technically not possible, a filter is installed at the in/output in each of the non correctly surrounded conductors, whereby the filter apart from coils and/or resistors and further components in a preferred embodiment has at the in/output one or more capacitive paths to the wall of the electromagnetically compatible enclosure.

4. System according to claim 1, characterized in that the signal conductors and power supply conductors extending between the electromagnetically compatible enclosures mutually and between these enclosures and the outside world are provided with filters at the in/output in/out of the enclosure whereby the filter apart from coils and/or resistors and other components in a preferred embodiment have at the in/output one or more capacitive paths to the wall of the electromagnetically compatible enclosure and whereby these filters are installed in each of the conductors of a circuit except in the conductor which functions as enclosure connected to the other enclosures.

5. System according to claim 1, characterized in that unavoidable holes in the electromagnetically compatible enclosures and in the enclosures of the signal conductors, power supply conductors, and high voltage conductors do comprise one or more tubes of electrically good conducting material which tubes are not functioning as part of the circuit of a signal conductor, power conductor or high voltage conductor, which tubes have a length/diameter ratio which is larger than approximately 2, whereby the edge of the hole is electrically conducting connected all around to the circumference of the tube.

6. System according to claim 5, characterized in that the holes in the tube can be provided with metal tubes, whereby more tubes can be installed parallel in the shape of a bundle which fits in or on the hole in the enclosure and whereby the length/diameter ratio of each of the tubes is larger than approximately 2.

7. System according to claim 1, characterized in that the system comprises sensors for measuring the dissipated power inside the corona discharge space.

8. System according to claim 7, characterized in that the sensors for measuring the power dissipated inside the corona discharge space comprise a voltage sensor formed by a ring or a section of a ring around or at least partly around the conductor which forms the connection between the corona wire and the high voltage generating source.

9. System according to claim 8, characterized in that the connection between the corona wire and the high voltage generating source is established through a gas-tight and fluid-tight high voltage feedthrough between the corona discharge space and the space in which the source for supplying the high voltage pulses is installed.

10. System according to claim 8, characterized in that the ring or ring section, forming the voltage sensor, is integrated in the high voltage throughput.

11. System according to claim 7, characterized in that the sensors for measuring the power dissipated inside the corona discharge space comprise a current sensor formed by a measuring winding or measuring loop installed at a distance around the conductor which forms the connection between the corona wire and the source for supplying the high voltage pulses.

12. System according to claim 11, characterized in that the measuring winding comprises only one loop.

13. System according to claim 7, characterized in that the sensors are connected to a power measuring circuit which is able to generate control signals which are dependent on the measured power, said control signals being sent to a control circuit forming part of the source for supplying high voltage pulses, by means of which control circuit the parameter of the high voltage pulses, for instance the amplitude or the pulse repetition frequency, can be influenced.

14. System according to claim 7, characterized in that the source for supplying high voltage pulses comprises:

a resonant charging circuit for charging each time a spark gap capacitor, a spark gap through which the capacitor can discharge as soon as the voltage across the capacitor is high enough, a voltage multiplier by means of which the pulse shaped spark gap voltage is increased.

15. System according to claim 14, characterized in that the resonant charging circuit comprises two stages:

a first stage in which starting from the rectified mains voltage through a triggered thyristor and through a coil a first capacitor is charged, and a second stage in which the first capacitor through a triggered thyristor is discharged across the primary winding of a high voltage transformer of which the secondary winding is connected to said spark gap capacitor.

16. System according to claim 15, characterized in that the first stage comprises a second capacitor which through a control circuit can be switched parallel to the first capacitor such that by transporting charge from the first capacitor to the second capacitor the initial voltage across the first capacitor preceding the charging process can be adjusted whereas furthermore the second capacitor can be discharged through said control circuit.

17. System according to claim 14, characterized in that the spark gap has a coaxial structure comprising an isolating body inside which the spark gap space is excavated, two spark gap electrodes in line with each other of which the ends are extending inside the spark gap space and two annular or cylindrical other conductors attached around the isolating body and mutually connected by means of an annular configuration of capacitors which together form the spark gap capacitor.

18. System according to claim 14, characterized in that the switching in the spark gap takes place by spontaneous breakthrough or by automatically triggered breakthrough.

19. System according to claim 14, characterized in that the spark gap may comprise a metal or tungsten needle-shaped triggering electrode which is installed in a passage through the high voltage spark gap electrode such that the needle is near the main discharge area, which trigger electrode is controlled by the voltage level on the high voltage terminal of the high voltage transformer.

20. System according to claim 14, characterized in that part of the electrodes in the spark gap is made of a metal being an alloy in which tungsten is one of the main components.

21. System according to claim 14, characterized in that the voltage multiplier is a so called parallel-serial switched cable pulser comprising a number of coaxial cable sections of the same length, of which the inner conductors are at the input side in common connected to one of the conducting parts of the spark gap, whereas the other conductors at the input side are in common connected to one side of the spark gap capacitor, whereas at the output side the inner conductor of the first cable section is connected to the other conductor of the second cable section, the inner conductor of the second cable section is connected to the outer conductor of the third cable section, etcetera, the outer conductor of the first section being earthed and the high voltage is taken off from the inner conductor of the last section.

22. System according to claim 21, characterized in that at the input side of the cable pulser the cable ends, stripped from their outer conductor, are inserted in a two-layer mounting plate of which the outer layer comprises an electrically conducting material and of which the inner layer comprises an electrically isolating material, whereby the outer jackets are connected to said conducting outer layer which in turn is connected to the respective outer conductor of the spark gap, whereas the inner conductors are connected to the respective spark gap electrode and the electrically isolating inner layer connects to the isolating body of the coaxial spark gap structure.

23. System according to claim 21, characterized in that the output of the cable pulser, i.e. the section where the cables are connected in series, is compactly built as a cable block made of electrically insulating material which functions as feedthrough isolator between the jacket and the core of the cables.

24. System according to claim 23, characterized in that near the output side of the parallel-serial connected cable pulser a ferrite collar or a series of ferrite cores is attached around the cable section to avoid feedback of waves through external structures.

25. System according to claim 1, characterized in that the corona wire is formed by a rod which near the connection with the output of the source for supplying high voltages is attached and of which the surface comprises a number of extending parts such as pikes or ribs.

26. System according to claim 25, characterized in that the rod is embodied as a threaded rod.

27. System according to claim 1, characterized in that the high voltage terminal of the high voltage transformer secondary winding is through a first diode and eventually a snubber circuit connected to the spark gap and is through a second, inversely connected diode and an impedance connected to earth whereby, dependent on the polarity of the primary connection of the high voltage transformer and the polarity of both diodes either a positive or negative high voltage is supplied to the spark gap.

* * * * *